:# 2,854,341
Patented Sept. 30, 1958

2,854,341
SODIUM CHLORIDE COMPOSITION

Frank Waldo, Pittsburgh, Pa., assignor to Columbia-Southern Chemical Corporation, Allegheny County, Pa., a corporation of Pennsylvania No Drawing. Application October 16, 1956
Serial No. 616,146

2 Claims. (Cl. 99—143)

This invention relates to a novel edible salt composition. It is commonly recognized that crystalline sodium chloride tends to absorb water, upon standing in atmospheric air of normal humidity, to such an extent that the crystals tend to coalesce and the product becomes lumpy.

According to the present invention, it has been found that a stable weather-proof composition may be provided by mixing crystalline sodium chloride of the conventional edible grade with a small amount, usually in the range of 0.1 to 5 percent by weight, of finely-divided, sodium aluminum silicate. Edible salt compositions comprising sodium chloride and the above-mentioned silicate are stable and do not agglomerate or become lumpy even when allowed to stand in a humid atmosphere for long periods of time.

The sodium aluminum silicate contemplated herein is a finely-divided product having an average ultimate particle size below 0.1 micron, generally about 0.02 and 0.03 micron, and a surface area ranging between 10 and 200 square meters per gram.

According to a preferred embodiment, a salt-silicate composition is prepared by using a sodium aluminum silicate having the following chemical analysis:

| | Percent by weight |
|---|---|
| $SiO_2$ | 67 |
| $Al_2O_3$ | 12 |
| $Na_2O$ | 9 |
| Ignition loss | 9 |

(Iron, calcium and titanium compounds, together with sulphates, make up the difference.)

Its physical properties are as follows:

| | |
|---|---|
| Refractive index | 1.55. |
| pH (20 percent slurry) | 10.5. |
| Specific gravity | 2.1. |
| Free moisture | 3–5 percent. |
| Screen residue (325 mesh) | 0.1 percent (maximum). |
| Average particle diameter | 0.02–0.03 micron. |

According to another embodiment of the present invention, a salt-silicate composition is prepared using a sodium aluminum silicate having the following analysis:

| | Percent by weight |
|---|---|
| Ignition loss at 100° C | 11.8 |
| Ignition loss at 105° C | 6.2 |
| $SiO_2$ | 65.0 |
| $Al_2O_3$ | 13.6 |
| CaO | 0.43 |
| MgO | 0.19 |
| S as $SO_3$ | 2.08 |
| N as $Na_2O$ | 8.05 |
| $CO_2$ | Less than 0.10 |
| Cl | Less than 0.10 |

The pH of the materials measured as a 20 percent slurry is about 10.7.

The sodium aluminum silicate is incorporated in the salt composition simply by mixing it with commercial crystalline sodium chloride, which may or may not contain impurities. In general, approximately 0.5 percent by weight of sodium aluminum silicate, based upon the weight of sodium chloride, is sufficient for the purpose. However, other concentrations, usually about 0.1 to 5 percent by weight of sodium aluminum silicate, based on the sodium chloride weight, may be used if desired.

The following is a typical illustrative composition:

99.0 pounds sodium chloride
1.0 pound sodium aluminum silicate

Other compounds, such as potassium or sodium iodide, sodium thiosulphate, and the like, may be present in the above described composition if desired.

Although the present invention has been described with reference to the specific details of certain embodiments, it is not intended that such details shall be regarded as limitations upon the scope of the invention, except insofar as included in the accompanying claims.

I claim:

1. An edible sodium chloride composition stabilized against agglomeration due to absorption of moisture, comprising an edible grade of sodium chloride and a small amount of finely-divided sodium aluminum silicate having an average ultimate particle size below 0.1 micron and a surface area ranging from 10 to 200 square meters per gram.

2. The composition of claim 1 wherein said sodium aluminum silicate is about 1.0 percent by weight, based upon the weight of said sodium chloride.

References Cited in the file of this patent
UNITED STATES PATENTS

| 2,407,151 | Glogau | Sept. 3, 1946 |
| 2,539,012 | Diamond et al. | Jan. 23, 1951 |
| 2,550,491 | McDonald | Apr. 24, 1951 |
| 2,664,357 | Miller | Dec. 29, 1953 |
| 2,768,899 | Waldo | Oct. 30, 1956 |